US007010121B2

(12) United States Patent  (10) Patent No.: US 7,010,121 B2
Wennemer et al.  (45) Date of Patent: Mar. 7, 2006

(54) MOBILE TELEPHONE AND METHOD FOR ITS MANUFACTURE

(75) Inventors: Dietmar F. Wennemer, San Diego, CA (US); Akos Feher, San Diego, CA (US); Isaac Ward, San Diego, CA (US); Kenneth Lawrence Weselake, San Diego, CA (US); David Owen West, San Diego, CA (US); Souhail Abood, San Diego, CA (US); Mai Doan, Santa Ana, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 759 days.

(21) Appl. No.: 09/924,070

(22) Filed: Aug. 6, 2001

(65) Prior Publication Data

US 2003/0027589 A1  Feb. 6, 2003

(51) Int. Cl.
    *H04Q 7/20*  (2006.01)
(52) U.S. Cl. ................ 379/433.01; 264/132; 264/259; 264/271.1; 264/271.13; 264/275; 29/458
(58) Field of Classification Search ............. 455/550, 455/575.1, 90.3; D14/426, 250; 264/132, 264/259, 271.1, 271.13, 271.15, 275; 29/458; 379/433.01, 458
    See application file for complete search history.

(56) References Cited

U.S. PATENT DOCUMENTS

| 5,832,388 | A | * | 11/1998 | Williams et al. ............ 455/557 |
| 5,923,752 | A | * | 7/1999 | McBride et al. ....... 379/433.11 |
| 6,094,565 | A | * | 7/2000 | Alberth et al. ........... 455/575.3 |
| 6,482,346 | B1 | * | 11/2002 | Alcazar ...................... 264/263 |
| 6,501,960 | B1 | * | 12/2002 | Jensen et al. ............ 455/550.1 |
| 6,607,627 | B1 | * | 8/2003 | Nelson ........................ 156/245 |
| 6,711,387 | B1 | * | 3/2004 | Lungley ................... 455/90.3 |
| 2002/0065054 | A1 | * | 5/2002 | Humphreys et al. .......... 455/90 |

FOREIGN PATENT DOCUMENTS

| EP | 0 755 767 A1 | 1/1997 |
| EP | 0 964 417 A2 | 12/1999 |

* cited by examiner

*Primary Examiner*—Temica Beamer
*Assistant Examiner*—Julio Perez

(57) ABSTRACT

A mobile telephone having a single piece molded housing or shell includes a core assembly for supporting the functional components of the mobile telephone. The core assembly may further include ancillary hardware components such as an electrical power source, user interface input/output devices, and the like required for operation of the telephone. The single piece molded shell molded about the core assembly so that the core assembly is substantially enclosed by the shell.

35 Claims, 7 Drawing Sheets

MOBILE TELEPHONE AND METHOD FOR ITS MANUFACTURE

BACKGROUND OF THE INVENTION

1. Field of the Invention

The present invention relates generally to mobile telephones, and more specifically to a mobile telephone having a single piece molded housing and method for its manufacture.

2. Description of the Related Art

Presently, housings of mobile telephones are used to provide structural, esthetical, and protective functions for the telephone. Such housings universally consist of two or more components or parts formed of a plastic material using an injection molding process. These components are then assembled together using fasteners such as screws, snap features, and the like to enclose and support the telephone's functional components.

The use of multiple-component housings in mobile telephones presents numerous design and manufacturing problems. For example, the manufacture of such housing components requires the design, production and maintenance of separate molding tools for each component. Further, the fit and quality of each housing component must be carefully controlled during design and manufacture for proper assembly. As a result, design and tooling costs for the production of such multiple component housings can be high. Moreover, the time required for the design of the internal and external features of the components of the housing and the design and manufacture of molding tools utilized for manufacturing such components can be undesirably long.

Complicating such design and manufacturing problems, the various housing components are often manufactured by parties other than the assembler of the mobile telephone. Thus, in a typical manufacturing process, such as manufacturing process 100 shown in FIG. 1, the components of a telephone's housing are molded, painted, and assembled by external sources (e.g., vendors, sub-contractors, or the like) prior to assembly of the telephone. For example, a molder 102 may produce housing components such as the upper case, lower case battery cover, display window, and the like for a mobile telephone. These components are then shipped to a painter 104 where they are painted and indicia such as keypad numerals, labeling, and the like are affixed as required. A housing sub-assembler 106 may then assemble the components into subassemblies (e.g., an upper case assembly and a lower case assembly) to which the functional components of the telephone may be attached during final assembly 108 prior to shipment 110 by the telephone manufacturer.

SUMMARY OF THE INVENTION

Accordingly, the present invention is directed to a mobile telephone having a single piece molded housing or shell and a method for its manufacture. In exemplary embodiments, the mobile telephone includes a core assembly for supporting the functional components of the mobile telephone. The core assembly may further include ancillary hardware components such as an electrical power source, user interface input/output devices, and the like required for operation of the telephone. A single piece shell is molded about the core assembly so that the core assembly is substantially enclosed by the shell.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
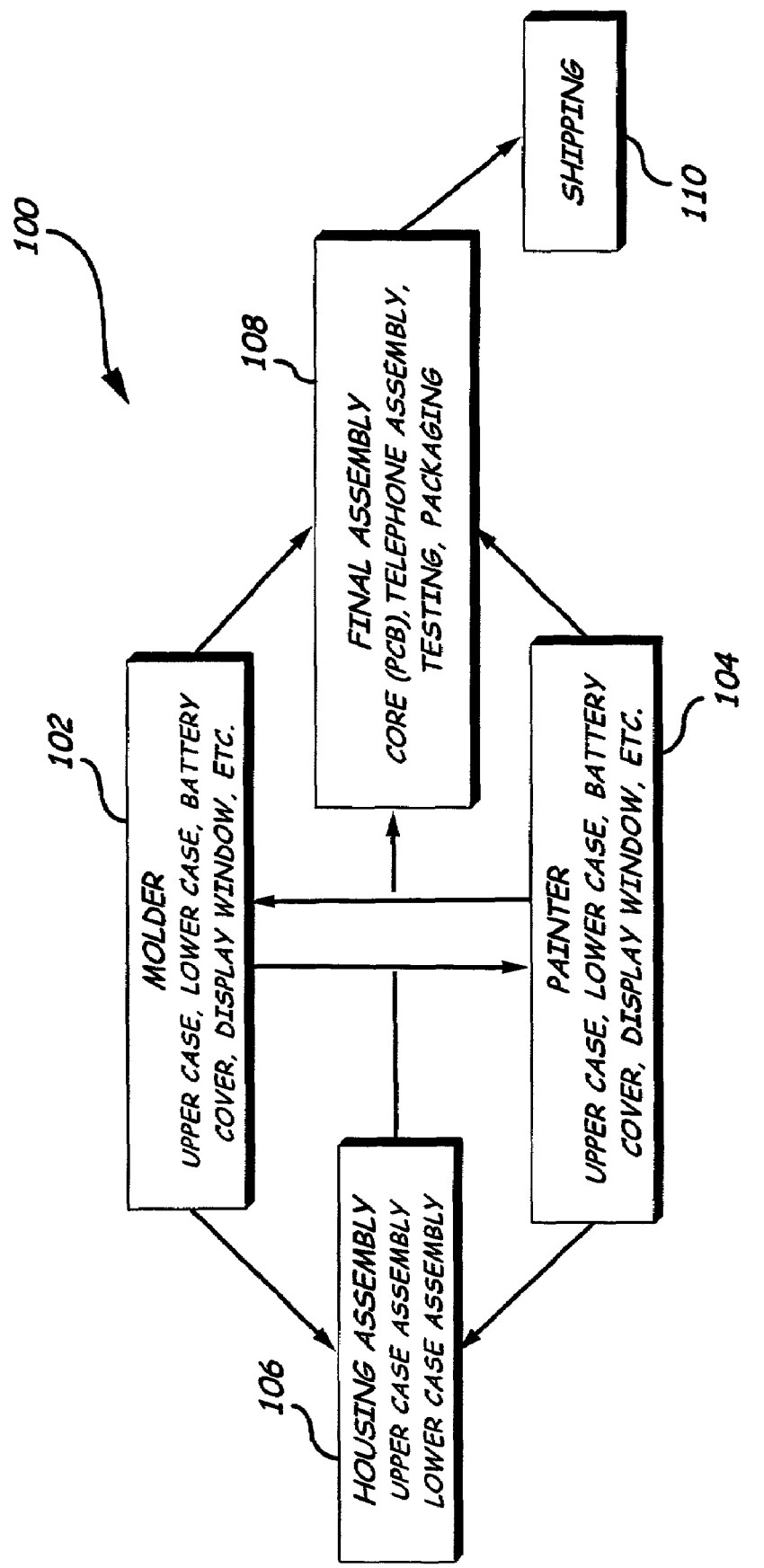
FIG. 1 is a block diagram illustrating exemplary outside sources involved in the manufacturing mobile telephones having conventional assembled clam shell type housings in accordance with the prior art.
Figure 2:
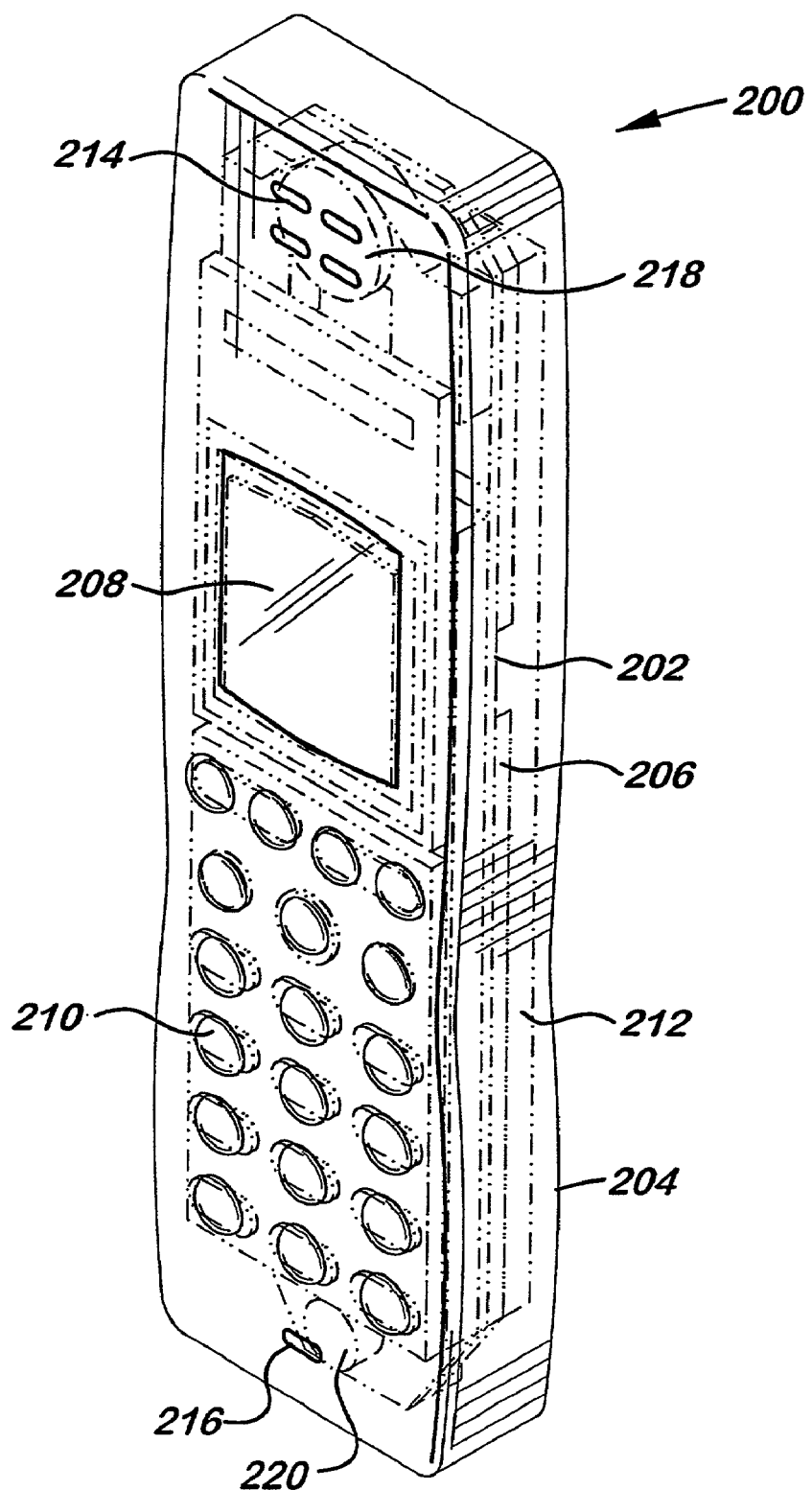
FIG. 2 is an isometric view illustrating a mobile telephone having a functional core assembly and a single piece molded housing in accordance with an exemplary embodiment of the present invention.

FIG. 2 illustrates a mobile telephone 200 manufactured in accordance with an exemplary embodiment of the present invention. Mobile telephone 200 is comprised of a core assembly 202 encased in a single piece molded housing or shell 204. In exemplary embodiments, core assembly 202 includes a functional core 206 comprised of a printed circuit board (PCB) supporting functional components of mobile telephone 200 such as the core processor, memory, a SIM (subscriber identification module) card reader, an antenna, I/O connectors, shielding, a battery charging circuitry, and the like.

The core assembly 202 may further include ancillary hardware components such as an electrical power source, user interface input/output devices (e.g., displays, touch-screen assemblies, keypads, apparatus for voice input, etc.), and the like required for operation of the telephone 200. For example, in the embodiment shown in FIG. 2, a display assembly 208 is coupled to functional core 206 for displaying information such as telephone numbers, alpha-numeric messages, electronic mail, command menus, address book entries, battery charge information, carrier signal strength, and the like to users of telephone 200. In embodiments of the invention, display assembly 208 may include a liquid crystal display (LCD), light emitting diode (LED) display, polymer light emitting diode (PLED) display, or the like for display of information and messages depending on the particular design requirements of mobile telephone 200. A user interface input device such as keypad assembly 210 is positioned adjacent to display assembly 208 for entry of information such as telephone numbers, commands, address book selections and the like by the user for control of mobile telephone 200. An internal power source such as rechargeable battery assembly 212 provides electrical power for core assembly 202, display assembly 208, and keypad assembly 210.

Shell 204 is comprised of a single-piece housing formed about core assembly 202 so that it substantially encloses functional core 206, display assembly 208, keypad assembly 210 and battery assembly 212. In exemplary embodiments, shell 204 may be molded around core assembly 202 via a suitable molding technology. Exemplary molding technologies that may be adapted for use in the fabrication of mobile telephone 200 include reaction injection molding (RIM), compression molding, foam urethane molding, reinforced foam molding, air casting, vacuum casting, dip casting, wax model casting, extrusion/blow molding, thermoforming, rotational casting, lost core molding, or the like. Depending on the requirements of the particular telephone design being manufactured and the molding technology employed, shell 204 may be molded from a suitable plastic material, which may be either a thermoplastic or a thermoset material.

In embodiments of the invention, part or all of shell 204 may be formed of a translucent or transparent material allowing all or part of core assembly 202 to be seen through the shell 204. In such embodiments, substances such as metal flakes, glitter, colored fibers, or the like may be suspended within the material for further decoration of the mobile telephone 200. Alternately, shell 204 may be molded of a generally opaque material that prevents core assembly 202 to be viewed by users of the mobile telephone 200. The material used for molding shell 204 may be tinted with a color prior to molding or painted after molding depending on design and marketing requirements of the manufacturer. Further, decoration and indicia may be printed or painted on shell 204 after molding, applied as decals, or applied using techniques such as in-mold decoration (IMD), applique molding, or the like. In embodiments of the invention wherein shell 204 is translucent or transparent, core assembly 202 may likewise be painted or decorated with graphics, logos, and the like, or provided with indicia.

Shell 204 may be formed of a material that hardens during molding to provide structural rigidity to telephone 200. Alternately, the material forming shell 204 may remain at least partially resilient after molding. In such embodiments, core assembly 202 may function as a structural backbone for telephone 200, providing structural rigidity to shell 204. For example, functional core 206 may include a printed circuit board (PCB) assembly that, when coupled to battery assembly 212, prevents shell 204 from being bent or twisted. Optionally, a structural member (not shown) may support the PCB for providing additional rigidity to the telephone 200.

Features may be molded into shell 204 for providing necessary access to components of core assembly 202. For example, as shown in FIG. 2, apertures 214 & 216 are formed in shell 204 to allow sound to more easily penetrate the shell 204 at speaker 218 and microphone 220 of core assembly 202. Additionally, shell 204 may allow the provision of an extendable antenna, I/O connectors for programming of the telephone and charging of battery assembly 212, connectors suitable for the attachment of an external earphone assembly, or the like. However, because shell 204 is molded to core assembly 202, mobile telephone 200 may remain substantially sealed against environmental contaminants such as moisture, dirt, and the like.

Shell 204 further provides access to display assembly 208 for viewing of displayed information. For instance, as shown in FIG. 2, shell 204 may be molded about core assembly 202 so that the display surface of display assembly 208 extends above the outer surface of the shell 204, and is therefore viewable by users of mobile telephone 200. Alternately, shell 204 may be molded to include an area over display assembly 208 that is substantially transparent. In this manner, shell 204 can allow viewing of displayed information while providing additional protection of the display assembly 208 from damage due to mishandling of the telephone 200. For example, in one embodiment, shell 204 may be molded of a generally opaque or translucent material. The portion of shell 204 extending over the display area of display assembly 208 may be molded so that this material is sufficiently thin to be substantially transparent. In a second embodiment, shell 204 may be formed entirely of a substantially transparent material. Thus, the portion of shell 204 extending over the display area of display assembly would be substantially transparent. In yet another embodiment, only the area of shell 204 extending over the display area of display assembly 208 may be formed of a substantially transparent material during molding, while the remainder of shell 204 is formed of an opaque or translucent material.

Shell 204 also allows selection of keys of keypad assembly 210. For example, in the embodiment shown in FIG. 2, the area of shell 204 over each key of keypad assembly 210 may be made sufficiently resilient to allow the key to be depressed when the area is pressed by a user. In the same manner, the key may be allowed to return to its non-depressed position when the area is released. In exemplary embodiments, a bump may be provided in the area of shell 204 over each key for indicating the position of the key to users of the telephone 200. Indicia may be furnished on or adjacent to the bumps for indicating the function of the key associated with each bump. Alternately, wherein shell 204 is molded of a transparent material, such indicia may be furnished by the keys of keypad assembly 210.

It will be appreciated that a single core assembly 202 may be accommodated by shells 204 having different external shapes. Thus, the shape of the mobile telephone 200 may be changed or updated periodically without affecting the design of the core assembly 202. Moreover, when the outer shape of the shell 204 is changed, only the outer surface is defined since the shell 204 is molded about the telephone's core assembly eliminating internal features. Thus, the amount of detail design required to define the shape of the shell 204 is reduced compared with prior art mobile telephones having multiple-component housings wherein the inner and outer surfaces of each component must be defined. Similarly, the core assembly 202 of the mobile telephone may be changed without modifying the shell 204 of the telephone 200. Thus, core assembly 202 of a mobile telephone 200 having a particular shape may be modified to accommodate different air interface technologies, or periodically updated to incorporate changes in those technologies without change to the shell 204.

Based on the description of an exemplary mobile telephone 200 in accordance with the present invention provided herein, it is contemplated that the specific configuration of the telephone 200 may be altered by persons skilled in the art without departing from the scope and spirit of the invention. For instance, in one embodiment, display assembly 208 may be enlarged and provided with a touch sensitive overlay or digitizer for entry of information via a stylus. In such an embodiment, keypad assembly 210 may be eliminated and its function provided by display assembly 208, thereby allowing mobile telephone 200 to provide additional functions such as organizers, calendars, electronic mail, network (e.g., Internet) browsing, and the like. Moreover, mobile telephone 200 is described herein in an exemplary embodiment as having a single component body. However, it is contemplated that dual component body telephones commonly referred to in the art as "flip-phones" or the like may be manufactured in accordance with the present invention. Such telephones typically include a main body portion containing the earpiece, display, and keypad of the telephone, and an extendable cover assembly containing the telephone's microphone. When not in use, the cover assembly is folded against the body portion thereby reducing the size of the telephone and protecting its display and keypad from damage.

Referring now to FIGS. 3 and 4A through 4E, a method 300 for assembling a mobile telephone in accordance with an exemplary embodiment of the present invention is described.

Figure 3:
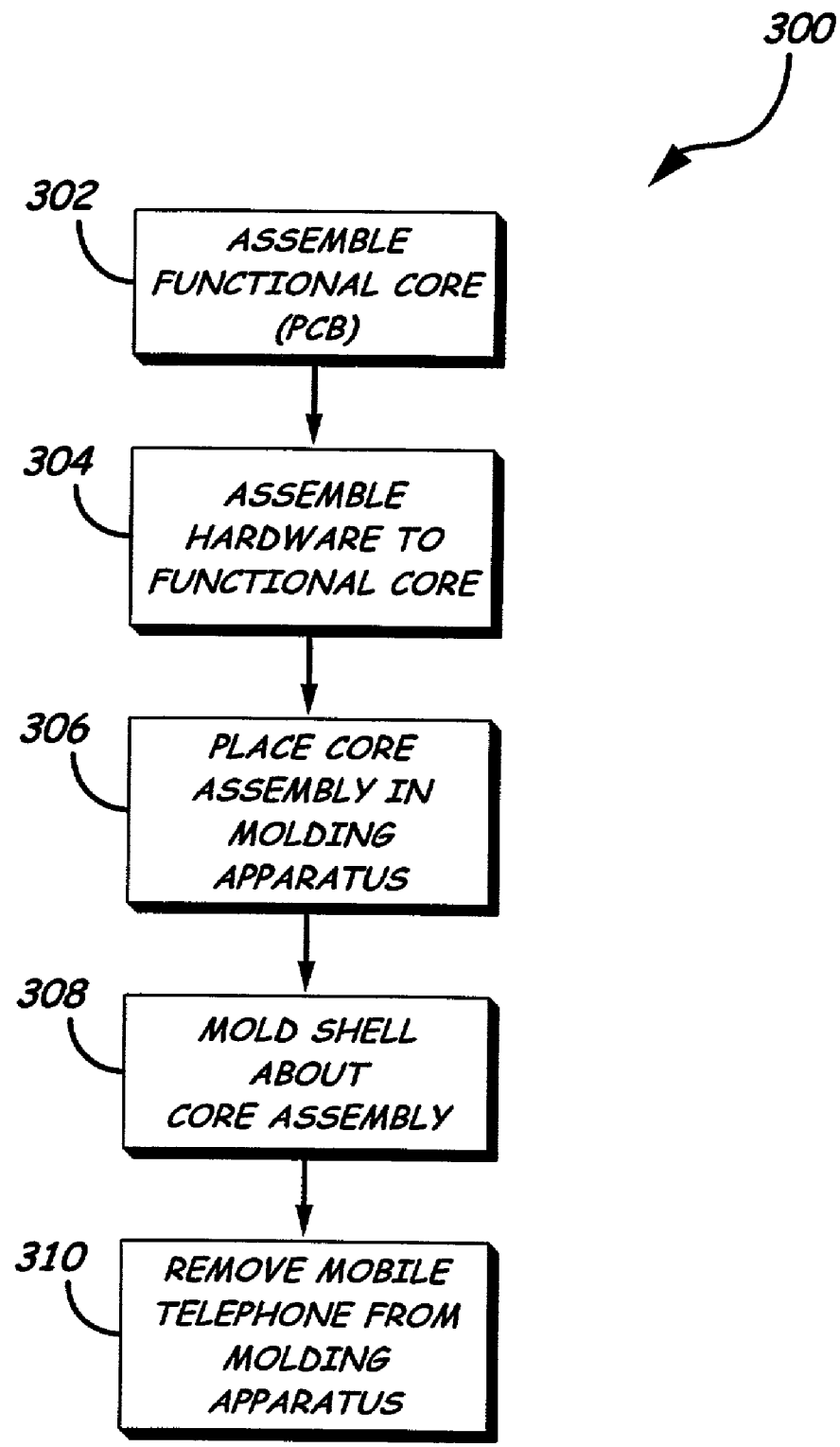
FIG. 3 is a flow diagram illustrating a method for assembling a mobile telephone having a functional core assembly and a single piece molded housing in accordance with an exemplary embodiment of the present invention.
Figures 4A, 4B:
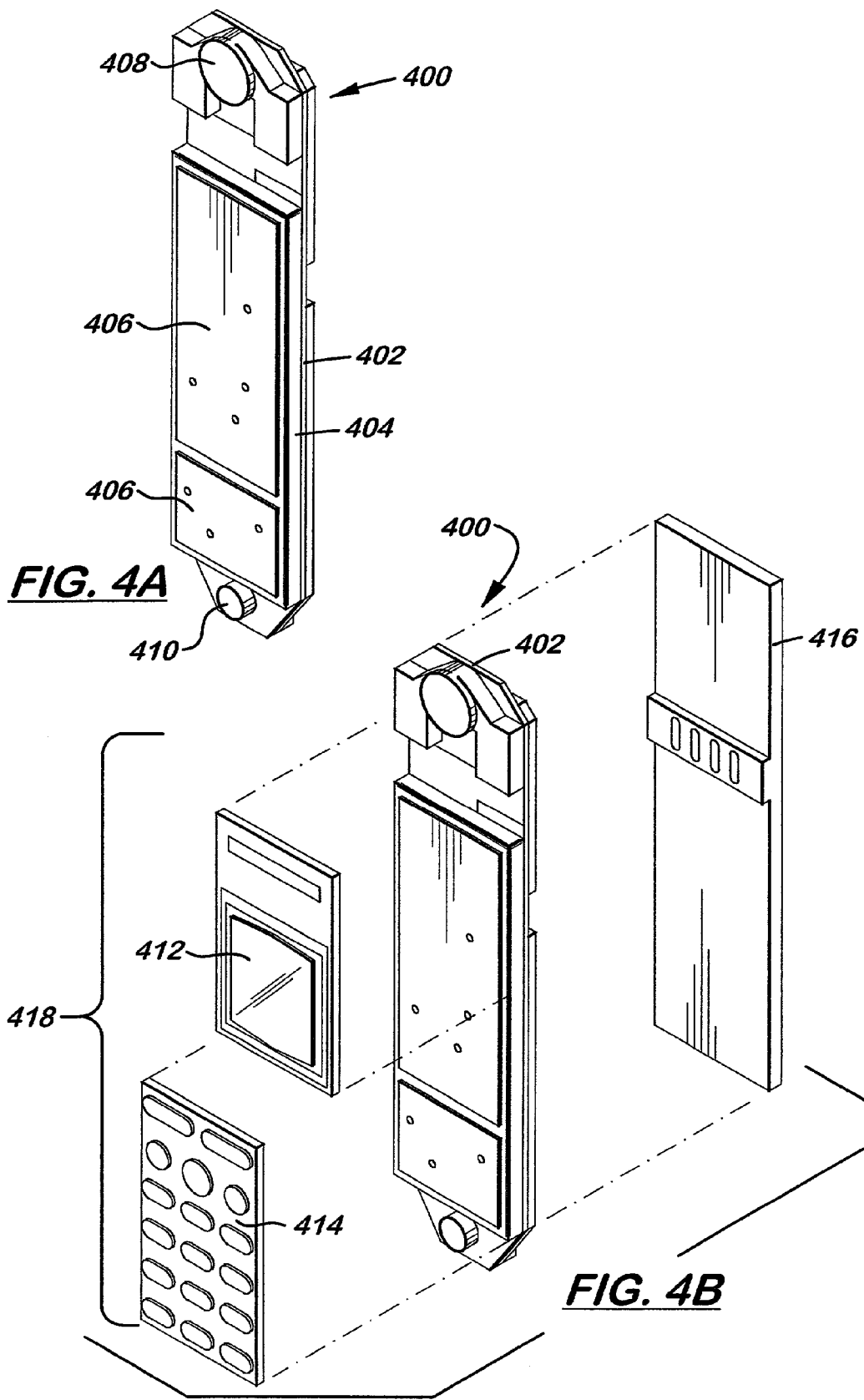
FIGS. 4A, 4B, 4C, 4D, and 4E are isometric views further illustrating the assembly of a mobile telephone utilizing the exemplary method shown in FIG. 3.
Figure 4C:
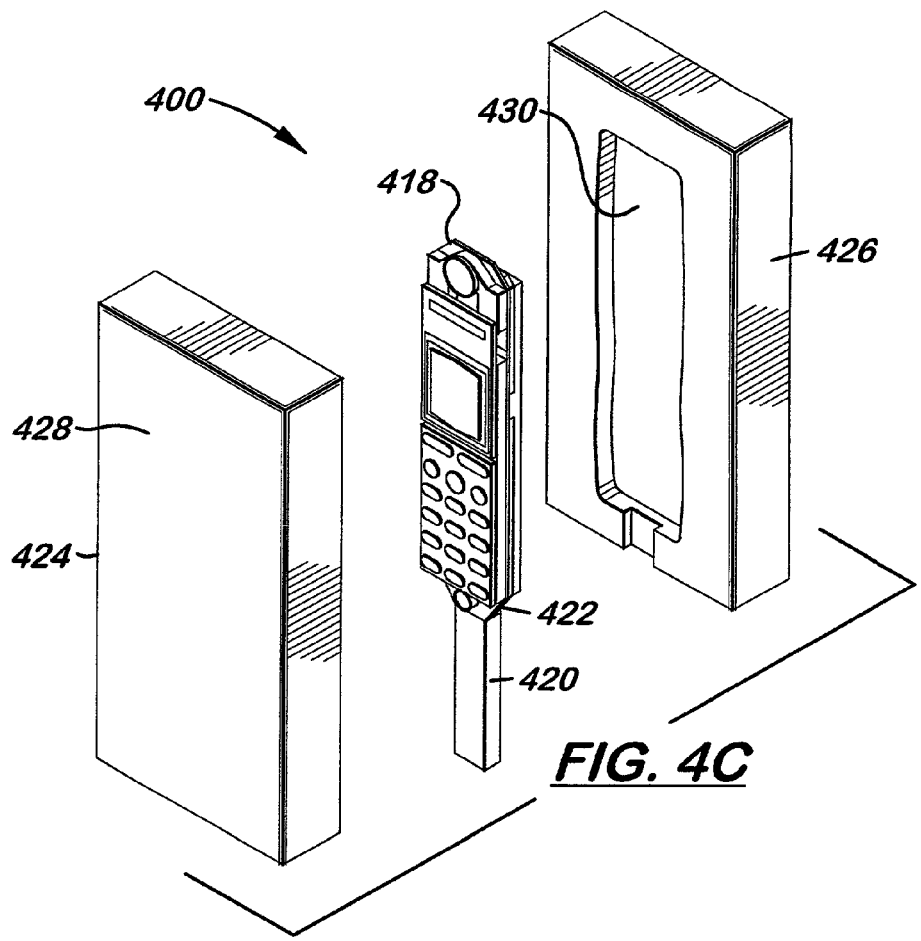

As shown in FIG. 3, the functional core of the mobile telephone is first assembled at step 302. For example, as shown in FIG. 4A, the functional core 402 may be formed from a printed circuit board (PCB) assembly 404 supporting functional components 406 of the mobile telephone 400 such as the core processor, memory, SIM (subscriber identification module) card reader, antenna, I/O connectors, shielding, battery charging circuitry, and the like. PCB assembly 404 may further support the telephone's speaker 408 and microphone 410. In embodiments of the invention, functional core 402 may form the backbone of mobile telephone 400. In such embodiments, the PCB assembly may include a structural member attached to the printed circuit board (PCB) for providing strength and rigidity to the PCB assembly 404.

Next, ancillary hardware components such as an electrical power source, user interface input/output devices, and the like, that are necessary for operation of the mobile telephone are assembled to the functional core at step 304. For instance, in one embodiment shown in FIG. 4B, a display assembly 412, keypad assembly 414, and battery assembly 416 may be assembled to functional core 402 thereby forming a fully functional core assembly 418 about which the shell of telephone 400 may be formed. Display assembly 412 may include a display such as a liquid crystal display (LCD), light emitting diode (LED) display, polymer light emitting diode (PLED) display, or the like for display of information and messages to users of mobile telephone 400. Wherein the display is an LCD, display assembly may further include a display window for covering and protecting the display and a lightguide for backlighting the display so that it may be viewed with little or no ambient light. Battery assembly 416 may include a rechargeable battery, and, optionally, associated charging circuitry required for controlling charging of the battery. In exemplary embodiments, the battery of battery assembly 416 may utilize Lithium ion polymer technology. However, it will be appreciated that the battery may alternately utilize other battery technologies such as Nickel Cadmium (NiCd) technology, Nickel Metal Hydride (NiMH), and the like without departing from the scope and spirit of the present invention. In embodiments of the invention, battery assembly 416 is permanently encased within the shell of mobile telephone 400. In such embodiments, battery assembly 416 may be directly attached (e.g., soldered) to PCB assembly 404 (FIG. 4A) thereby eliminating the need for separate battery connectors or contacts.

Figure 4D:
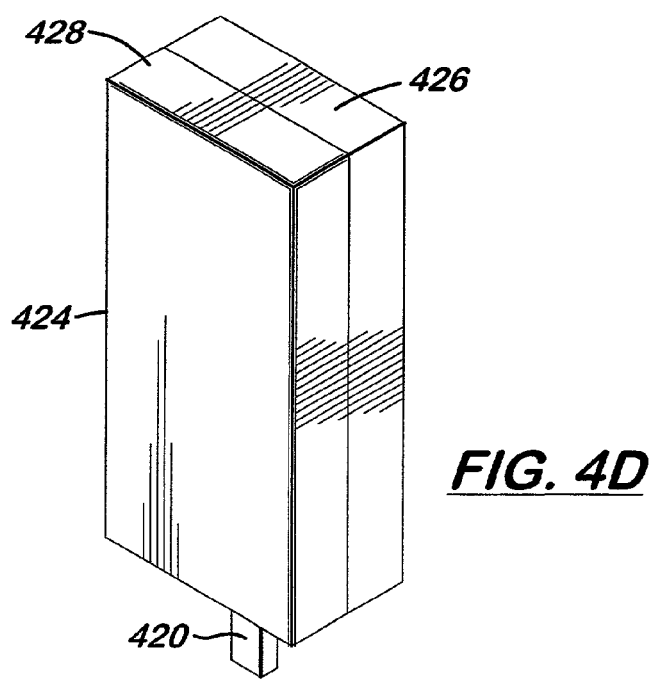
Figure 4E:
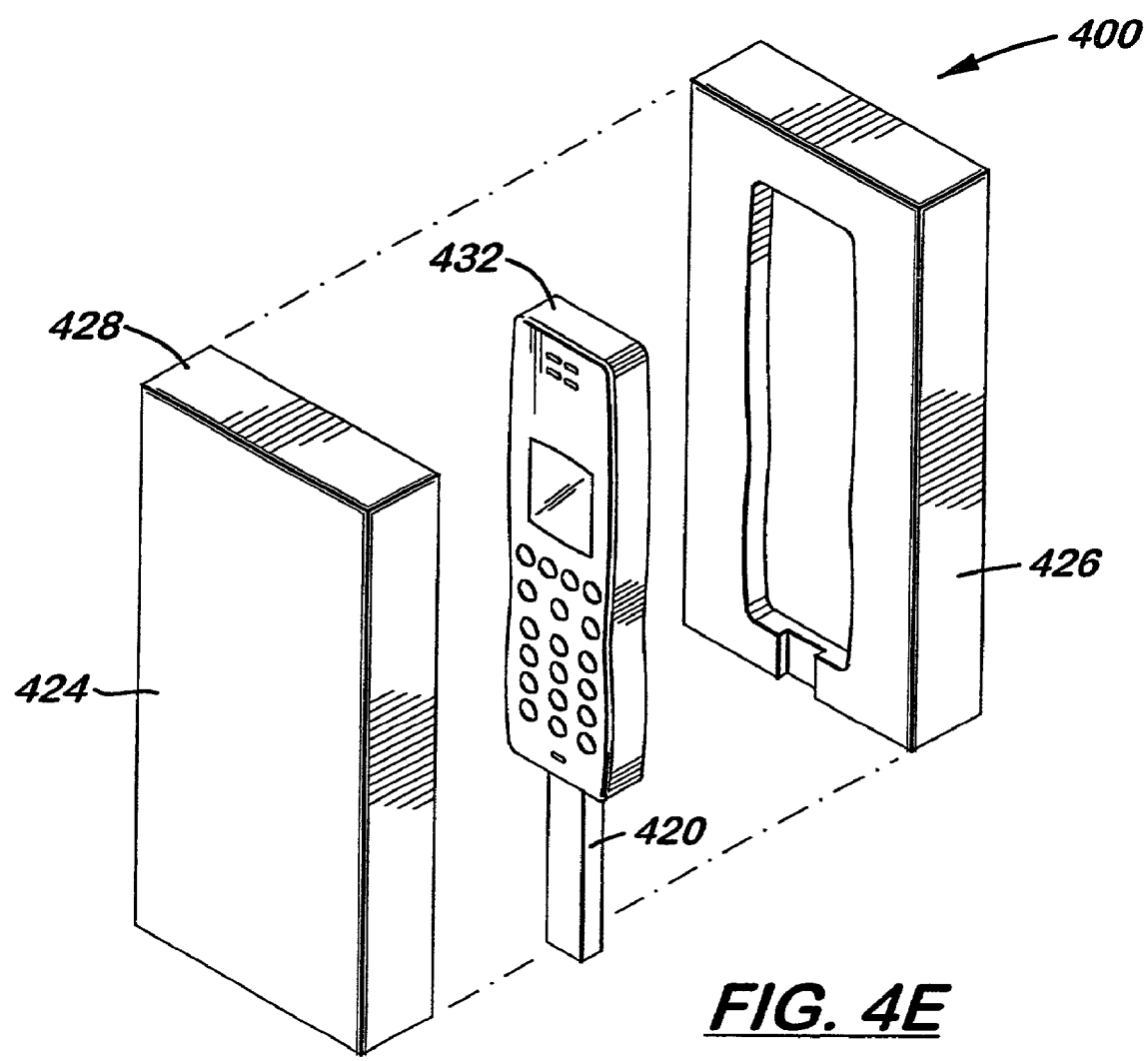

Turning again to FIG. 3, the core assembly assembled at step 302 is then placed in the molding apparatus or tool at step 304. The shell of the telephone is then molded about the core assembly at step 308. The completed mobile telephone may then be removed from the molding apparatus at step 310. For instance, in the embodiment shown in FIG. 4C, 4D and 4E, the core assembly 418 is then placed within mold assembly 424. A support 420 is attached to core assembly 418 of the mobile telephone 400, for example, to I/O connector 422. In exemplary embodiments, mold assembly 424 includes a first mold half 426 and a second mold half 428, which when closed together, as shown in FIG. 4D, form a cavity 430 about core assembly 418 shaped to mold the front, back and side surfaces of the shell 432 of mobile telephone 400 (FIG. 4E). During molding, support 420 positions core assembly 418 within cavity 430 so that core assembly is correctly positioned within the shell 432 of the mobile telephone 400. As shown in FIG. 4E, once molding of shell 432 is completed, telephone 400 may be removed from mold assembly 424. The mobile telephone 400 may then be painted if necessary, and tested for proper operation. Alternately, techniques such as in-mold decoration (IMD), applique molding, and the like may be utilized for application of indicia such as keypad characters, graphical decorations, and the like to shell 432 during molding.

It will be appreciated by those of skill in the art, that various molding technologies may be adapted for molding the mobile telephone's shell depending on the particular requirements of the manufacturer. Such molding technologies include, but are not limited to, reaction injection molding (RIM), compression molding, foam urethane molding, reinforced foam molding, air casting, vacuum casting, dip casting, wax model casting, extrusion/blow molding, thermoforming, rotational casting, and lost core molding. Consequently, it is contemplated that the exact configuration of molding apparatus may be modified by those of skill in the art to accommodate the specific molding technology employed. Such modification would not depart from the scope and spirit of the present invention as claimed in the appended claims.

Figure 5:
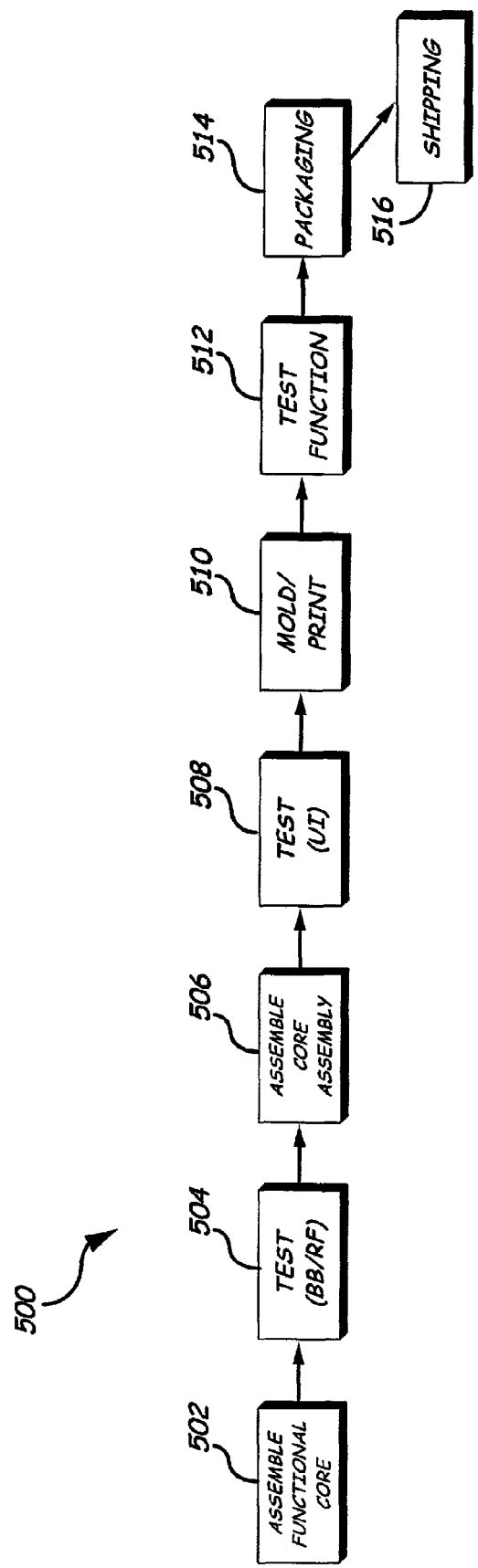
FIG. 5 is a block diagram illustrating an exemplary method for manufacturing a mobile telephone having a functional core assembly and a single piece molded housing utilizing the method shown in FIG. 3.

FIG. 5 illustrates an exemplary method 500 for manufacturing mobile telephones having single piece molded shells in accordance with an exemplary embodiment of the present invention. As shown in FIG. 5, the functional core of the mobile telephone is first assembled at step 502. The functional core, once assembled, may optionally be subjected to testing at step 504 to verify its proper assembly and function. Such testing may include, but are not limited to, baseband (BB) testing for verifying correct assembly and radio frequency (RF) testing for verifying proper operation and programming. Next, ancillary hardware necessary for operation of the mobile telephone such as the display assembly, keypad assembly, battery assembly, an external antenna, and the like is assembled to the functional core at step 506. The user interface (UI) provided by the display assembly, keypad, and associated user interface software may then be tested at step 508 to verify its proper function. In exemplary embodiments, this testing may be accomplished prior to molding of the telephone's shell, since the core assembly may be fully functional without the shell. If the user interface is found to be functioning properly, the shell may be molded about the core assembly at step 510. Indicia may be painted or printed onto the shell as required, applied as decals, or, alternatively, formed within the molding apparatus utilizing techniques such as in-mold decoration (IMD), or the like. The completed mobile telephone may then subjected to a final functional test, at step 512, prior to being packaged at step 514 and shipped at step 516.

By molding the shell of the mobile telephone directly onto the telephone's functional core assembly, the manufacturing process for the mobile telephone may be simplified. For instance, in exemplary embodiments, the core assembly may be assembled and molded into the shell at one physical location. In this manner, the assembly, molding, testing, packaging, and shipping of mobile telephones may be accomplished in a linear sequence. Thus, the use of external sources for the manufacture housing components may be eliminated.

When a new telephone shell is designed, only the outer surface of the shell need be defined since the shell is molded about the telephone's core assembly. Thus, compared with prior art mobile telephones having multiple component housings wherein the inner and outer surfaces of each component must be defined, the amount of detail required to define the shape of the shell is reduced. Accordingly, the costs and time requirements associated with the design of telephones employing the present invention are reduced. Additionally, because only one molding tool is built and maintained, tooling costs are greatly reduced. Moreover, fewer prototypes are required to verify the mold design, simplifying quality control. For instance, in exemplary embodiments, the time required for the design of a mobile telephone in accordance with the present invention may be reduced from an average of twelve weeks to approximately eight weeks, while the number of mechanical parts such as housing components, snaps, screws, and the like may be reduced by up to approximately 40 percent. Similarly, the amount of time required to develop tooling for production of the telephone may be reduced from an average of four weeks to approximately two weeks, while the cost of such tooling may be reduced by up to approximately 60 percent. Thus, the overall cost of the telephone may be reduced compared with mobile telephones employing multiple component housings.

Although the invention has been described with a certain degree of particularity, it should be recognized that elements thereof may be altered by persons skilled in the art without departing from the scope and spirit of the invention. It is understood that the specific orders or hierarchies of steps in the methods 300 & 500 illustrated in FIGS. 3 and 5, respectively, are examples of exemplary approaches. Based upon design preferences, it is understood that the specific orders or hierarchies of these methods can be rearranged while remaining within the scope of the present invention. The accompanying method claims present elements of the various steps of methods 300 & 500 in a sample order, and are not meant to be limited to the specific order or hierarchy presented.

It is believed that the of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A mobile telephone, comprising:
   a circuit board assembly for supporting at least one functional component of the mobile telephone; and
   a shell for substantially enclosing the circuit board assembly,
   wherein the shell is molded onto the circuit board assembly and the at least one functional component so that the shell at least substantially encapsulates the circuit board assembly and the at least one functional component.

2. The mobile telephone as claimed in claim 1, further comprising a user interface input/output device coupled to the circuit board assembly for communication of information with a user of the mobile telephone.

3. The mobile telephone as claimed in claim 2, wherein the user interface input/output device comprises a display assembly for displaying information to the user, the display assembly being viewable through the shell.

4. The mobile telephone as claimed in claim 2, wherein the user interface input/output device comprises a keypad assembly.

5. The mobile telephone as claimed in claim 1, where in the at least one functional component comprises at least one of a core processor, an antenna, a SIM card reader, memory, and an I/O connector.

6. The mobile telephone as claimed in claim 1, further comprising an electrical power source.

7. The mobile telephone as claimed in claim 6, wherein the electrical power source comprises a battery assembly coupled to the circuit board assembly.

8. The mobile telephone as claimed in claim 7, wherein the shell is formed of a resilient material, and wherein the circuit board assembly and battery assembly function as a backbone for the mobile telephone for providing rigidity to the shell.

9. The mobile telephone as claimed in claim 1, wherein the shell is rigid.

10. The mobile telephone as claimed in claim 1, wherein the shell is formed of a resilient material, and wherein the functional circuit board assembly forms a backbone for the mobile telephone for providing rigidity to the shell.

11. A method for assembling a mobile telephone, comprising:
    assembling a functional core assembly including at least one functional component of the mobile telephone; and
    molding a shell about the functional core assembly, the shell substantially enclosing the functional core assembly, by placing the functional core assembly in a molding apparatus, wherein the shell is molded around the functional core assembly, and removing the mobile telephone from the molding apparatus.

12. The method as claimed in claim 11, wherein the step of assembling the functional core assembly comprises assembling a functional core including a printed circuit board assembly wherein the at least one functional component is supported by the printed circuit board assembly.

13. The method as claimed in claim 12, wherein the step of assembling the functional core assembly further comprises coupling an ancillary hardware component to the functional core.

14. The method as claimed in claim 12, wherein the step of assembling the functional core assembly further comprises coupling a user interface input/output device to the functional core.

15. The method as claimed in claim 12, wherein the step of assembling the functional core assembly further comprises coupling a display assembly and a keypad assembly to the functional core.

16. The method as claimed in claim 12, wherein the step of assembling the functional core assembly further comprises coupling a battery assembly to the functional core.

17. The method as claimed in claim 11, further comprising adding indicia to the shell.

18. The method as claimed in claim 11, further comprising painting the shell after molding.

19. The method as claimed in claim 11, further comprising testing the mobile telephone for proper operation.

20. A method for assembling a mobile telephone, comprising:
- assembling a functional core including a printed circuit board supporting at least one functional component of the mobile telephone;
- attaching ancillary hardware necessary for operation of the mobile telephone to the functional core to form a core assembly;
- placing the functional core assembly in a molding apparatus;
- molding a shell about the functional core assembly, the shell substantially enclosing the functional core assembly; and
- removing the mobile telephone from the molding apparatus after molding of the shell.

21. The method as claimed in claim 20, wherein the step of attaching ancillary hardware to the functional core comprises coupling a display assembly to the functional core.

22. The method as claimed in claim 20, wherein the step of attaching ancillary hardware to the functional core comprises coupling a keypad assembly to the functional core.

23. The method as claimed in claim 20, wherein the step of attaching ancillary hardware to the functional core comprises coupling a battery assembly to the functional core.

24. The method as claimed in claim 20, further comprising adding indicia to the shell.

25. The method as claimed in claim 20, further comprising painting the shell after molding.

26. The method as claimed in claim 20, further comprising testing the mobile telephone for proper operation.

27. A mobile telephone, comprising:
- a core assembly for supporting at least one functional component of the mobile telephone; and
- a shell molded onto the core assembly so that the core assembly is at least substantially encapsulated within the shell,
- wherein the shell provides an external shape to the mobile telephone and is molded of a translucent or transparent material for allowing the core assembly to be at least partially viewed through the shell.

28. The mobile telephone as claimed in claim 27, wherein the shell is formed of a resilient material, and wherein the functional core assembly forms a backbone for the mobile telephone for providing rigidity to the shell.

29. The mobile telephone as claimed in claim 27, wherein the core assembly comprises:
- a printed circuit board assembly supporting the at least one functional component;
- a display assembly coupled to the printed circuit board assembly for displaying information to the user, the display assembly being viewable through the shell;
- a keypad assembly coupled to the printed circuit board assembly for receiving input of information, the shell being molded over the keypad assembly; and
- a battery assembly coupled to the printed circuit board assembly for providing electrical power for the mobile telephone.

30. The mobile telephone as claimed in claim 29, where in the at least one functional component comprises at least one of a core processor, an antenna, a SIM card reader, memory, and an I/O connector.

31. The mobile telephone as claimed in claim 29, wherein the shell is formed of a resilient material, and wherein the printed circuit board assembly and battery assembly function as a backbone for the mobile telephone for providing rigidity to the shell.

32. The mobile telephone as claimed in claim 29, wherein the shell is sufficiently thin over the display assembly so as to be at least substantially transparent over the display assembly.

33. The mobile telephone as claimed in claim 27, wherein the shell is molded of a rigid material.

34. The mobile telephone as claimed in claim 27, wherein at least one of graphics, logos and indicia are applied to the core assembly, the graphics, logos or indicia being viewable through the shell.

35. The mobile telephone as claimed in claim 27, wherein at least one of graphics, logos and indicia are applied to the shell.

* * * * *